(12) United States Patent
Yamashita

(10) Patent No.: US 8,514,100 B2
(45) Date of Patent: Aug. 20, 2013

(54) VEHICLE APPROACH WARNING SYSTEM

(75) Inventor: Youji Yamashita, Obu (JP)

(73) Assignee: Denso Corporation, Kariya (JP)

( * ) Notice: Subject to any disclaimer, the term of this patent is extended or adjusted under 35 U.S.C. 154(b) by 260 days.

(21) Appl. No.: 12/932,691

(22) Filed: Mar. 3, 2011

(65) Prior Publication Data

US 2011/0234422 A1    Sep. 29, 2011

(30) Foreign Application Priority Data

Mar. 23, 2010   (JP) .................................. 2010-66899

(51) Int. Cl.
*G08G 1/16*    (2006.01)

(52) U.S. Cl.
USPC ............ 340/901; 340/4.1; 340/435; 340/438; 340/903; 342/455; 382/103; 382/106; 701/301

(58) Field of Classification Search
USPC .................. 340/901, 903, 944, 925, 439, 4.1; 342/455; 382/103, 106; 701/301
See application file for complete search history.

(56) References Cited

U.S. PATENT DOCUMENTS

| | | | |
|---|---|---|---|
| 2006/0056664 A1* | 3/2006 | Iwasaki | 382/115 |
| 2006/0109095 A1 | 5/2006 | Takata et al. | |
| 2009/0296989 A1* | 12/2009 | Ramesh et al. | 382/103 |
| 2011/0128161 A1* | 6/2011 | Bae et al. | 340/901 |
| 2011/0199199 A1* | 8/2011 | Perkins | 340/435 |

FOREIGN PATENT DOCUMENTS

| | | |
|---|---|---|
| JP | 2004-145660 | 5/2004 |
| JP | 2004-153929 | 5/2004 |
| JP | 2004-154660 | 6/2004 |
| JP | 2005-165422 | 6/2005 |
| JP | 2006-252264 | 9/2006 |
| JP | 2008-197720 | 8/2008 |
| JP | 2008-273251 | 11/2008 |

OTHER PUBLICATIONS

Office Action mailed Jul. 3, 2012 in corresponding Japanese Application No. 2010-66899 with English translation.

* cited by examiner

*Primary Examiner* — Daniel Wu
*Assistant Examiner* — Benyam Haile
(74) *Attorney, Agent, or Firm* — Harness, Dickey & Pierce, PLC

(57) ABSTRACT

A control unit detects presence of a person and a direction of his/her face based on image information inputted from an imaging device, and determines that a warning need be provided to notify the person of vehicle approach if the person is detected but his/her face is not detected. The control unit checks a determination result as to whether the warning should be provided to a warning sound output device. The warning sound output device generates warning sound in response to the determination result indicating that sound warning is needed.

10 Claims, 2 Drawing Sheets

VEHICLE APPROACH WARNING SYSTEM

CROSS REFERENCE TO RELATED APPLICATION

This application is based on and incorporates herein by reference Japanese Patent Application No. 2010-66899 filed on Mar. 23, 2010.

FIELD OF THE INVENTION

The present invention relates to a vehicle approach warning system, which provides warning indicating approach of a vehicle.

BACKGROUND OF THE INVENTION

According to a vehicle approach warning system disclosed in JP 2008-197720A for example, a vehicle is equipped with a radar device for detecting an object body such as a person, an infrared camera for imaging the object body and a sound generator for generating warning sound based on data acquired by the radar and the infrared camera. Specifically, the sound generator recognizes a person based on the acquired data and generates warning sound only when the recognized person is moving in a direction, which crosses a direction of travel of the vehicle. It is thus possible to inhibit generation of the warning sound when the person is already aware of approach of a vehicle and limit generation of the warning sound to only cases that the person will have a risk of touching the vehicle.

According to the conventional technology, it is assumed that the person is not aware of approaching of the vehicle if the direction of movement of the person includes a direction component, which is perpendicular to the direction of travel of the vehicle.

A person normally keeps standing beside a traffic lane, on which a vehicle is traveling, before crossing a road. In this instance, the person may keep directing his/her face on a vehicle approaching on the opposite traffic lane and be unaware of a vehicle, which is approaching on the traffic lane closer to the person. Thus, in some instances, the person is not aware of approach of a vehicle even when the person is not moving. The vehicle should provide warning sound in such a case, because the person may start to move into the traffic lane to cross the road. Therefore, the conventional technology is not satisfactory in that the sound warning is limited to cases, in which the person is moving.

SUMMARY OF THE INVENTION

It is therefore an object of the present invention to provide a vehicle approach warning system, which provides appropriate warning indicating approach of a vehicle.

According to one aspect of the present invention, a vehicle approach warning system includes a person state detection part, a warning control part and an approach warning part. The person state detection part detects a person present around a vehicle and a state of the person. The warning control part checks whether a warning, which indicates vehicle approach is needed, based on a detection result of the person state detection part. The approach warning part generates the warning in response to a check result of the warning control part indicating that the warning is needed. The person state detection part further detects a direction of the face of the person as the state of the person based on whether the face of the person is detected. The warning control part further determines that the warning of the vehicle approach is needed in response to the detection result indicating that the person is detected but the face of the person is not detected.

According to another aspect of the present invention, a vehicle approach warning system includes an imaging device, a control unit and a warning output device. The imaging device takes an image in a forward area in a direction of travel of a vehicle. The control unit checks a state of a person present in the forward area based on the image taken by the imaging device. The state of a person includes at least one of whether the person is in a plurality of persons, whether the person is with a cane, whether the person is with a dog and whether the person is directing his/her face toward the vehicle. The warning output device generates warning indicating approach of the vehicle in response to only a check result of the control unit, which indicates that the person is in the plurality of persons, the person is with the cane, the person is with the dog or the person is not directing his/her face towards the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
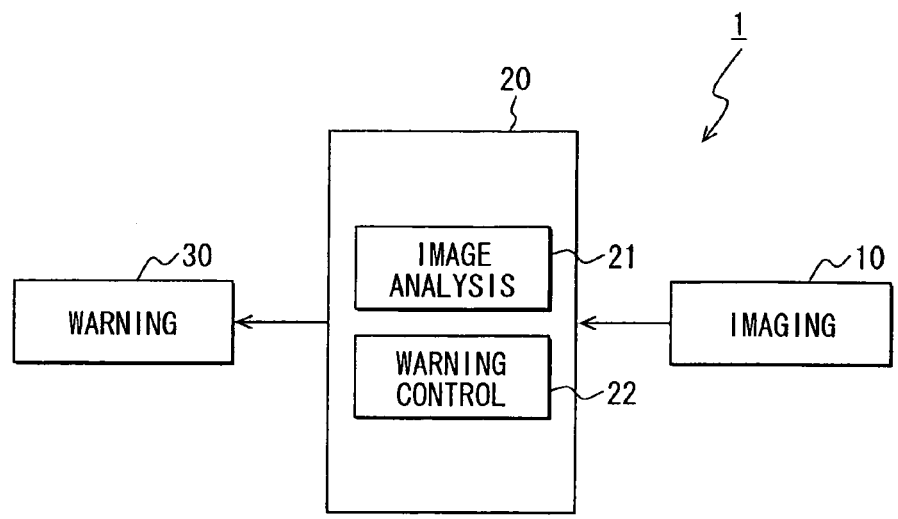
FIG. 1 is a block diagram showing one embodiment of a vehicle approach warning system according to the present invention.

A vehicle approach warning system according to the present invention will be described below with reference to embodiments shown in the drawings.

Figure 2:
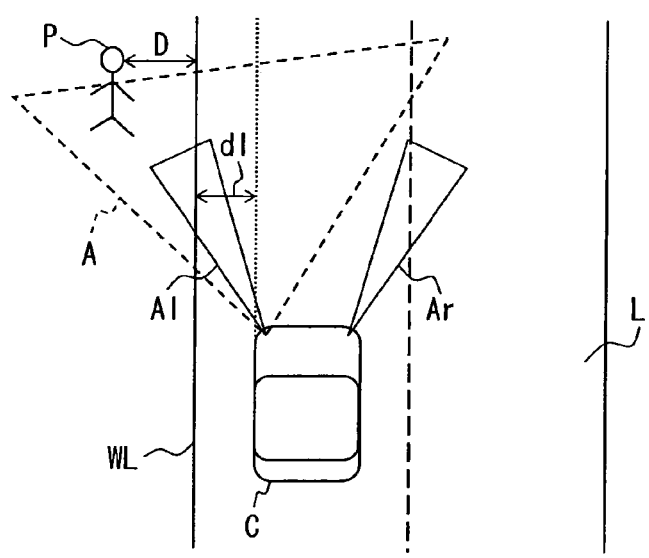
FIG. 2 is a schematic diagram showing a detection area of an imaging device in the embodiment.
Figure 3:
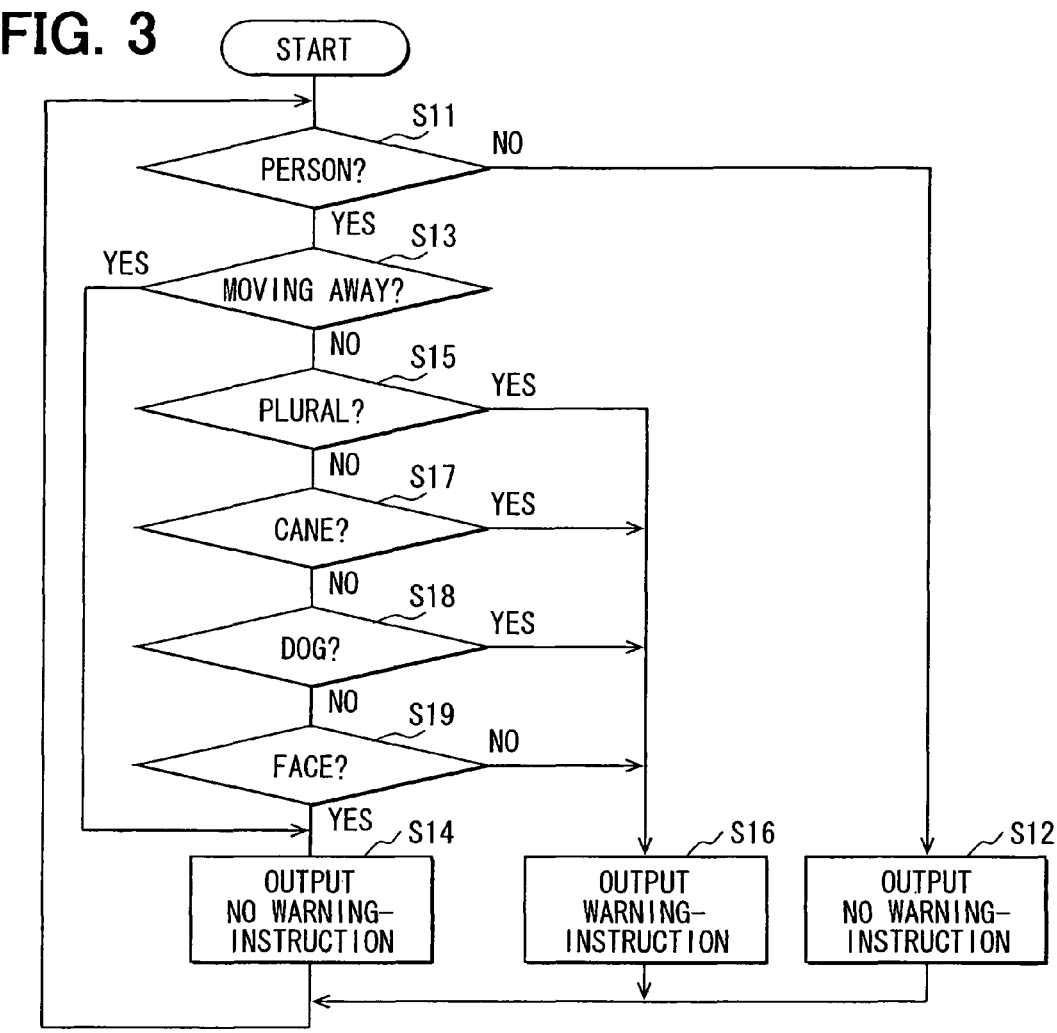
FIG. 3 is a flowchart showing processing of vehicle approach warning, which is executed in the embodiment.

In one embodiment shown in FIGS. 1 to 3, a vehicle approach warning system is denoted by reference numeral 1 and mounted on a vehicle C shown in FIG. 2. It is assumed that the vehicle C has a lane-keep assisting function, which assists the vehicle C to maintain a predetermined distance dl from a left side surface of the vehicle C to a left lane mark white line WL of a travel road L in traveling the road L as shown in FIG. 2.

As show in FIG. 1, the vehicle approach warning system 1 includes an imaging device 10, a control unit 20 and a warning output device 30. The control unit 20 is a computer including a CPU, a built-in memory and the like. The CPU performs programs stored in the built-in memory to attain various functions. The control unit 20 has an image analysis part, a warning control part 22 and the like. The built-in memory of the control unit 20 is provided with, in addition to programs, a plurality of shape patterns of a person body, a person face, a dog body, a cane and other object bodies. The imaging device 10 and the image analysis part 21 operate as a person state detection part and the warning output device 30 operates as a warning part.

The imaging device 10 may be a conventional camera, which is provided at both left and right parts at the front side of the vehicle C, and connected to the control unit 10. The imaging device 10 takes the image of a person detection area A in the front periphery of the vehicle and outputs image information corresponding to the taken image of the person detection area A to the control unit 20. The person detection area A is shown exemplarily by a dotted line (triangular shape) in FIG. 2 as existing at the left side in the forward travel direction of the vehicle C. This person detection area A is taken by the imaging device 10 provided to image the front left part, which is ahead of the vehicle C. The person detection area A is set to cover a side area including a sidewalk adjacent to the travel road L. This side area may be set to about 10 meters from the vehicle C in the lateral (left-right) direction of the vehicle C. The person detection area A is set to cover a front area corresponding to a safety area, in which the vehicle C will not hit a person P rushing into the travel road L if a driver of the vehicle C brakes the vehicle. This front area may be set to about 50 meters from the vehicle C in the longitudinal (front-rear) direction, particularly in the forward direction of the vehicle C.

The person detection area A of the imaging device 10 mounted on the front left side of the vehicle C is set to include a lane mark white line detection area Al, which is on the left side of the vehicle C. Another lane mark white line detection area Ar of the imaging device 10 mounted on the front right side of the vehicle C, is also shown in FIG. 2. The lane mark white line detection area Al is included in the person detection area A, because the imaging device 10 operates as an imaging device for the lane-keep assist function. Alternatively, the imaging device 10 may be mounted on the vehicle C for person detection only separately from an imaging device for the lane-keep assist function.

The image analysis part 21 is configured to detect, based on the image information inputted from the imaging device 10, a person P present near the vehicle C, face of the person P, a cane, a dog, a distance D between the person P and the lane mark white line WL separating the travel road L and the sidewalk, a distance dl between the lane mark white line WL and the side surface of the vehicle C, and the like.

Specifically, the image analysis part 21 detects the lane mark white line WL of the travel road L by analyzing the image information received from the imaging device 10, particularly the image information corresponding to the lane mark white line detection areas Al and Ar. The image analysis part 21 further detects the distance dl between the detected white line WL and the side surface of the vehicle C. The lane mark white line WL and the distance dl may be detected by conventional image processing technology.

The image analysis part 21 compares the shape of the object body acquired by analyzing the image information received from the imaging device 10 with shape patterns of object bodies stored in the built-in memory. Thus, by conventional pattern matching method, the image analysis part 21 checks whether the detected object body corresponds to a person, whether there are more than a predetermined number of persons if a plurality of object bodies are detected, whether the person has a cane or a dog if the detected object body corresponds to a person, whether the face is successfully detected if the detected object corresponds to a person. The image analysis part 21 detects the distance D from the detected object body, which is determined to correspond to a person, to the lane mark white line WL of the road L.

The warning control part 22 determines, based on the person and his/her state detected by the image analysis part 21, whether sound warning should be provided to indicate approach of a vehicle.

Specifically, the warning control part 22 determines that sound warning is not needed, if the object body detected by the image analysis part 21 corresponds to a person and further his/her face is detected by the image analysis part 21. It is noted that successful detection of the face indicates that the person is watching the vehicle and normally well aware of approach of a vehicle. In this instance, sound warning is not provided because it will be annoying to the person. The detection of face is preferably performed by detecting both eyes and entirety of face. However, it may be only one eye or a part of the face, that is, side face. The warning control part 22 determines that the sound warning is needed, if the object body detected by the image analysis part 21 corresponds to a person but his/her face is not detected by the image analysis part 21. It is noted that unsuccessful detection of the face indicates that the person is not watching the vehicle and normally unaware of approach of a vehicle.

The warning control part 22 however determines that the sound warning is needed irrespective of detection of the faces of persons, if the object body detected by the image analysis part 21 corresponds to more than a predetermined number (for example, more than seven) of persons within a predetermined range (for example, several meters). It is normally difficult to detect the faces of all the persons, even if more than the predetermined number of persons are detected within the predetermined range by the image analysis part 21. Even if all the faces are detected, it is still likely that some of the persons are talking one another and hence unaware of approach of a vehicle. The predetermined number of the persons may be two or more.

The warning control part 22 determines that the sound warning is needed irrespective of detection of the faces of persons, if the object body detected by the image analysis part 21 corresponds to a person using a cane or taking a dog. It is noted that detection of the person using a cane or taking a dog indicates that the person is possibly a blind person. Even if the face of the blind person is successfully detected, it is likely that the blind person is not aware of approach of a vehicle.

The warning control part 22 determines that the sound warning is not needed irrespective of detection of the face of a person, if the object body detected by the image analysis part 21 corresponds to a person but the distance D between the person and the lane mark white line WL increases in a repetition of imaging operation of the imaging device 10. It is noted that increase of the distance D indicates that the person is moving away from the travel road L. In this instance, whether the person is aware of approach of a vehicle, it is less likely that the vehicle will hit or contact the person. The warning control part 22 may also determine that the sound warning is not needed, if the distance D does not change after being decreased.

The warning control part 22 outputs a determination result about necessity of sound warning to thereby control the warning output device 30.

The warning output device 30 receives the determination result from the control unit 20, particularly the warning control part 22, and includes a speaker, which generates sound indicating vehicle approach.

The warning output device 30 generates the warning sound indicating vehicle approach in response to a determination result indicating necessity of sound warning. The warning output device 30 does not generate the warning sound in response to a determination result indicating no necessity of sound warning.

For the above operation of the vehicle approach warning system 1, the control unit 20 is configured to execute vehicle approach warning processing programmed as shown in FIG. 3.

In the vehicle approach warning processing, the control unit 20 (specifically the image analysis part 21) checks at step (S) 11 whether a person is detected as a result of acquiring and analyzing the image information of the imaging device 1.

If no person is detected (NO at S11), no sound warning is needed. Therefore, the control unit 20 outputs at S12 a determination result indicating no person (no warning-instruction) to the warning output device 30. The warning output device 30 generates no warning sound in response to no warning-instruction.

If a person is detected (YES at S11), the control unit 20 checks at S13 whether the person is moving away. If the person is moving away or has moved away (YES at S13), the control unit 20 outputs at S14 no warning-instruction to the warning output device 30 although the person is detected. The warning output device 30 generates no warning sound.

If the person is not moving away (NO at S13), the person is assumed to be moving toward the travel road or not moving. The control unit 20 then checks at S15 whether there are more than a predetermined number of persons, that is, whether the number of persons is plural. If the number of persons is plural (YES at S15), the control unit 20 outputs at S16 a warning-instruction to the warning output device 30. The warning output device 30 outputs the warning sound in response to the warning-instruction.

If the number of persons is not plural (NO at S15), the control unit 20 checks at S17 whether the person has a cane. If the person has a cane (YES at S17), the control unit 20 outputs the warning-instruction at S16 in the similar manner as the case of detection of plural persons (YES at S15). The warning output device 30 outputs the warning sound in response to the warning-instruction.

If the person has no cane (NO at S17), the control unit 20 further checks at S18 whether the person is with a dog. If the person has a dog (YES at S18), the control unit 20 outputs the warning-instruction to the warning output device 30. The warning output device 30 outputs the warning sound in response to the warning-instruction.

If the person is not with a dog (NO at S18), the control unit 20 checks at S19 whether a face of the person is detected. If the face is detected (YES at S19), the control unit 20 assumes that the person is aware of the vehicle C and outputs the no-warning instruction to the warning output device 30 at S14. The warning output device 30 outputs no warning sound in response to the no warning-instruction.

If the face is not detected (NO at S19), the control unit 20 outputs the warning-instruction to the warning output device 30 at S16 in the similar manner as YES determinations at S15, S17 and S18. It is noted that the warning-instruction is outputted at S15, S17 and S18 irrespective of whether the face of the person is detected. The warning output device 30 outputs the warning sound in response to the warning-instruction.

According to the embodiment described above, the control unit 20 detects a face of a person based on image information received from the imaging device 10. If the face is not detected, the control unit 20 determines that warning of the vehicle approach is needed. The control unit 20 outputs its determination result about necessity of sound warning to audibly indicate the vehicle approach. The warning output device 30 outputs the sound warning indicating the vehicle approach in response to the determination result, which corresponds to the warning-instruction.

No detection of the face of the person indicates that the person is not directing his/her face toward the vehicle and hence is not aware of the vehicle. The control unit 20 determines that the warning sound should be generated in such a case. The warning output device 30 is thus controlled to generate the warning sound. The vehicle approach is notified more appropriately than in the conventional sound warning system, in which the sound warning is provided only when the person is moving.

The vehicle approach warning system 1 is not limited to the disclosed embodiment but may be modified in various ways as exemplified below.

The warning of vehicle approach may be provided by a light warning device, which provides warning of vehicle approach by light. For example, the light warning device may use a light mounted exclusively for the vehicle approach warning or an existing light such as headlights mounted on the vehicle. The exclusive light or the headlights may be driven to emit light and direct its light towards the person in response to the warning-instruction from the control unit 20.

The warning of vehicle approach may be provided by wind with or without smell. For example, the warning wind may be generated by a blower or an air gun mounted exclusively for the wind generation. The exclusive blower or air gun may be driven to generate warning wind and direct it towards the person in response to the warning-instruction from the control unit 20.

The air gun is formed of a main body, a control mechanism and a pressure mechanism. The main body has discharge holes over its surface to discharge inside air externally. The control mechanism controls the direction of the surface, over which the discharge holes are provided. The pressure mechanism pressurizes surfaces other than the surface having the discharge holes. By controlling the direction of the surface having the discharge holes by the control mechanism and momentarily pressurizing the surfaces having no discharge holes by the pressure mechanism, the pressure inside the body is momentarily raised so that the air inside the body is discharged through the discharge holes. The air (wind) blown out through the discharge holes of the body notifies the person of the vehicle approach. It is possible to add smell to the wind by providing an aromatic substance body with the blower or in the body of the air gun so that the air includes aromatic smell.

In place of one imaging device 10 provided at each of the front left part and the front right part of the vehicle C as a person detection part, two imaging devices 10 may be provided at each of the front left part and the front right part, that is, left part and right part in the forward direction, of the vehicle C. The control unit 20 may detect the distance D and the distance dl based on the image information supplied from the two imaging devices provided at each of left and right parts by using the conventional stereo processing method.

Figure 4:
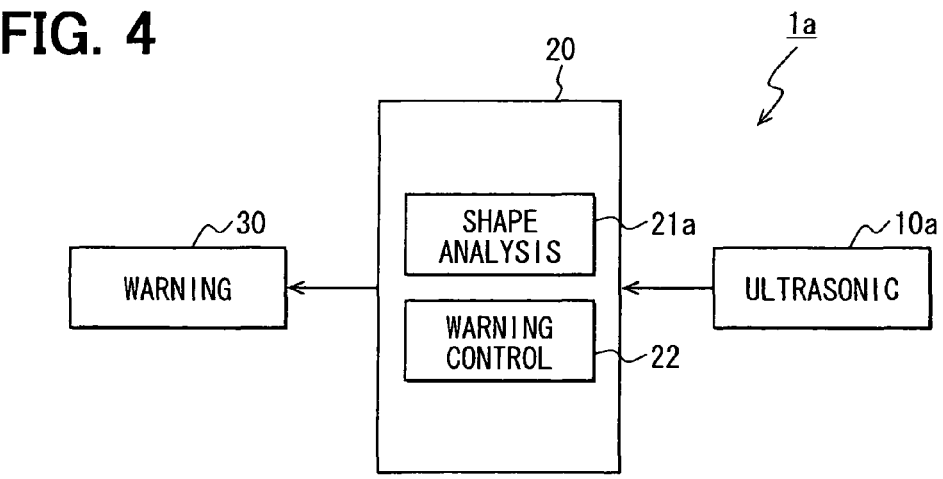
FIG. 4 is a block diagram showing another embodiment of a vehicle approach warning system according to the present invention.

The person detection part is not limited to the imaging device 10 and the image analysis part 21. For example, as shown in FIG. 4, a vehicle approach warning system 1*a* may have an ultrasonic sensor 10*a* and a shape analysis part 21*a* as the person detection part.

The ultrasonic sensor 10*a*, which is conventional, is mounted at each of the front left part and the front rear part of the vehicle C. The sensor 10*a* performs scanning in both parallel direction and perpendicular direction relative to the road surface of the travel road L of the vehicle C and calculates distances to the object body based on a time interval from transmission of ultrasonic wave from the ultrasonic sensor 10*a* to reception of the ultrasonic wave reflected by the object body. The object body may be a person, a dog, an object and the like, which are present in a detection area of the ultrasonic sensor 10*a*. The detection area is defined as an area, in which the ultrasonic wave transmitted from the ultrasonic sensor 10*a* is reflected by the object and the reflected wave is received by the ultrasonic sensor 10*a*. The sensor 10*a* outputs distance information corresponding to the calculated distance to the scanned part.

The shape analysis part 21 analyzes the outer shape of the object body and shapes of convex and concave parts of the object body based on the distance information corresponding to the scanned part. The shape analysis part 21*a* compares the analyzed shape of the object body with shape patterns of object bodies stored in the built-in memory. Thus, by conventional pattern matching method, the shape analysis part 21*a* checks whether the detected object body corresponds to a person, whether there are more than a predetermined number of persons if the object body indicates persons, whether the person has a cane, whether the person has a dog if the detected object body corresponds to a person, whether the face is successfully detected if the detected object corresponds to a person.

The warning control part 22 may not necessarily execute S13, by which no sound warning of the vehicle approach is provided irrespective of successful or unsuccessful detection of the face because the person is moving away from the vehicle C (YES at S13). Thus, the sound warning may be provided by the warning output device 30 even if the person is moving away from the vehicle C.

The warning control part 22 may not necessarily execute S17, by which the sound warning of vehicle approach is provided at S16 irrespective of successful or unsuccessful detection of the face because the person has a cane (YES at S17).

The warning control part 22 may not necessarily execute S18, by which the sound warning of vehicle approach is provided at S16 irrespective of successful or unsuccessful detection of the face because the person has a dog (YES at S18).

The warning control part 22 may not necessarily execute S15, by which the sound warning of vehicle approach is provided at S16 irrespective of successful or unsuccessful detection of the face because there are more than the predetermined number of persons (YES at S15).

In place of outputting the sound warning only when the warning-instruction is outputted from the warning control part 22, the warning output device 30 may output the sound warning at different sound levels, that is, at large sound level and low sound level larger than and lower than a predetermined level, in response to the warning-instruction and no warning-instruction outputted from the warning control part 22, respectively.

The warning output device 30 may provide the sound warning at a large sound level larger than a predetermined level, if the distance D between the person P and the lane mark white line WL is determined to be unchanged, decreasing or zero, in case of providing the vehicle approach. In addition, the vehicle C may be decelerated automatically in correspondence to the sound warning.

The warning output device 30 may provide the sound warning persistently until the vehicle C completes passing by the persons, if more than the predetermined number of persons are detected (YES at S15).

What is claimed is:

1. A vehicle approach warning system comprising:
a person state detection part for detecting a person present around a vehicle and a state of the person;
a warning control part for checking whether a warning, which indicates vehicle approach is needed, based on a detection result of the person state detection part; and
an approach warning part for generating the warning in response to a check result of the warning control part indicating that the warning is needed; wherein
the person state detection part is configured to detect a face of the person as the state of the person based on whether the face of the person is detected,
the warning control part is configured to determine that the warning of the vehicle approach is needed in response to the detection result indicating that the person is detected but the face of the person is not detected;
the person state detection part is configured to detect a number of persons in addition to the person and the state of the person; and
the warning control part is configured to determine that the warning of the vehicle approach is needed in response to the detection result of the person detection part indicating that more than a predetermined number of persons are present in a predetermined area irrespective of the detection result of the person state detection part regarding the face of the person.

2. A vehicle approach warning system comprising:
a person state detection part for detecting a person present around a vehicle and a state of the person;
a warning control part for checking whether a warning, which indicates vehicle approach is needed, based on a detection result of the person state detection part; and
an approach warning part for generating the warning in response to a check result of the warning control part indicating that the warning is needed; wherein
the person state detection part is configured to detect a face of the person as the state of the person based on whether the face of the person is detected,
the warning control part is configured to determine that the warning of the vehicle approach is needed in response to the detection result indicating that the person is detected but the face of the person is not detected;
the person state detection part is configured to detect a cane in addition to the person and the face of the person; and
the warning control part is configured to determine that the warning of the vehicle approach is needed in response to the detection result of the person state detection part indicating that the person has the cane and irrespective of the detection result of the person detection part regarding the face of the person.

3. A vehicle approach warning system comprising:
a person state detection part for detecting a person present around a vehicle and a state of the person;
a warning control part for checking whether a warning, which indicates vehicle approach is needed, based on a detection result of the person state detection part; and
an approach warning part for generating the warning in response to a check result of the warning control part indicating that the warning is needed; wherein
the person state detection part is configured to detect a face of the person as the state of the person based on whether the face of the person is detected,
the warning control part is configured to determine that the warning of the vehicle approach is needed in response to the detection result indicating that the person is detected but the face of the person is not detected;
the person state detection part is configured to detect a dog in addition to the person and the face of the person; and
the warning control part is configured to determine that the warning of the vehicle approach is needed in response to the detection result of the person state detection part indicating that the person has the dog and irrespective of the detection result of the person detection part regarding the face of the person.

4. The vehicle approach warning system according to claim 1, wherein:
the person state detection part is configured to detect a distance between the person and a travel road of the vehicle repetitively; and
the warning control part is configured to determine that the warning of the vehicle approach is not needed in response to the detection result of the person state detection part indicating that the distance is increasing and irrespective of the detection result of the person detection part regarding the face of the person.

5. The vehicle approach warning system according to claim 1, wherein:
the person state detection part includes an imaging device for taking an image of a peripheral area of the vehicle, and an image analysis part for analyzing an image taken by the imaging device.

6. The vehicle approach warning system according to claim 1, wherein:
the person state detection part includes an ultrasonic sensor for detecting distance between the vehicle and an object body located in the peripheral part of the vehicle, and a shape analysis part for analyzing a shape of the object body based on the distances detected by the person state detection part.

7. The vehicle approach warning system according to claim 1, wherein:
the approach warning part includes a sound warning device for notifying the person of the vehicle approach by generation of warning sound.

8. The vehicle approach warning system according to claim 1, wherein:
the approach warning part includes a light warning device for notifying the person of the vehicle approach by generation of warning light.

9. A vehicle approach warning system comprising:
a person state detection part for detecting a person present around a vehicle and a state of the person;
a warning control part for checking whether a warning, which indicates vehicle approach is needed, based on a detection result of the person state detection part; and
an approach warning part for generating the warning in response to a check result of the warning control part indicating that the warning is needed; wherein
the person state detection part is configured to detect a face of the person as the state of the person based on whether the face of the person is detected,
the warning control part is configured to determine that the warning of the vehicle approach is needed in response to the detection result indicating that the person is detected but the face of the person is not detected; and
the approach warning part includes a wind warning device for notifying the person of the vehicle approach by generation of warning wind.

10. A vehicle approach warning system comprising:
an imaging device configured to take an image in a forward area in a direction of travel of a vehicle;
a control unit configured to check a state of a person present in the forward area based on the image taken by the imaging device, the state of a person including at least one of whether the person is in a plurality of persons, whether the person is with a cane, whether the person is with a dog and whether the person is directing his/her face toward the vehicle;
a warning output device configured to generate a warning indicating approach of the vehicle in response to only a check result of the control unit, which indicates that the person is in the plurality of persons, the person is with the cane, the person is with the dog or the person is not directing his/her face towards the vehicle; wherein
the person state detection part is configured to detect a number of persons in addition to the person and the state of the person; and
the warning control part is configured to determine that the warning of the vehicle approach is needed in response to the detection result of the person detection part indicating that more than a predetermined number of persons are present in a predetermined area irrespective of the detection result of the person state detection part regarding the face of the person.

* * * * *